United States Patent
Wu

(10) Patent No.: US 6,808,625 B1
(45) Date of Patent: Oct. 26, 2004

(54) AQUARIUM PROTEIN SKIMMER

(76) Inventor: Chen-Yang Wu, 9 Grace Ct. North, Great Neck, NY (US) 11021

( * ) Notice: Subject to any disclaimer, the term of this patent is extended or adjusted under 35 U.S.C. 154(b) by 0 days.

(21) Appl. No.: 10/739,038

(22) Filed: Dec. 19, 2003

(51) Int. Cl.[7] ............................. C02F 1/24; A01K 63/04
(52) U.S. Cl. .................. 210/221.2; 210/169; 119/263; 119/264
(58) Field of Search .............................. 210/221.2, 169; 119/263, 264

(56) References Cited

U.S. PATENT DOCUMENTS

| | | | |
|---|---|---|---|
| 5,006,230 A | | 4/1991 | Votava, III et al. |
| 5,282,962 A | | 2/1994 | Chen |
| 5,746,921 A | * | 5/1998 | Gargas et al. ............... 210/617 |
| 5,776,335 A | * | 7/1998 | Overath ........................ 210/169 |
| 5,800,704 A | * | 9/1998 | Hansen ........................ 210/169 |
| 6,156,209 A | | 12/2000 | Kim |
| 6,303,028 B1 | | 10/2001 | Marks et al. |
| 6,436,295 B2 | | 8/2002 | Kim |

FOREIGN PATENT DOCUMENTS

WO     WO 9851618 A1 * 11/1998 ............. C02F/1/24

* cited by examiner

*Primary Examiner*—Thomas M. Lithgow
(74) *Attorney, Agent, or Firm*—Richard C. Litman

(57) ABSTRACT

The aquarium protein skimmer utilizes a re-circulating water pump to create a re-circulating flow of water within the skimmer's reaction chamber. The re-circulating water flow retains air bubbles within the reaction chamber for a longer period of time, increasing the capacity of the air bubbles to attract waste material and remove the waste material from the aquarium. Additionally, the re-circulating water flow causes air bubbles to break down into a greater number of smaller sized bubbles, further increasing the skimmer's efficiency. In a preferred embodiment, the aquarium protein skimmer utilizes a single water pump both to create a re-circulating flow of air-bubble laden water within the reaction chamber and to circulate aquarium water through the protein skimmer.

6 Claims, 7 Drawing Sheets

AQUARIUM PROTEIN SKIMMER

BACKGROUND OF THE INVENTION

1. Field of the Invention

The present invention relates to aquarium cleaning and filtration apparatus, and more specifically to an aquarium protein skimmer.

2. Description of the Related Art

Aquarium hobbyists recognize and appreciate the need to maintain high quality water conditions in aquariums that are home to fish and underwater creatures, including tropical fish, marine fish, and marine reef creatures, such as corals, sponges, and more. Numerous techniques are employed for cleaning, treating, and filtering aquarium water to insure a healthy and vibrant environment for the aquarium inhabitants. For each technique there are numerous different kinds of equipment and apparatus to be employed.

One technique for cleaning aquarium water is known as protein skimming, also known as foam fractionalization or adsorptive foam separation. Protein skimming is a process wherein air bubbles are introduced into a volume of water. organic molecular compounds, known as surfactants, such as proteins and other organic waste materials, are attracted to the water surface surrounding the air bubbles. As the surfactants collect in sufficient amounts, they form a "skin" around the air bubbles. The bubbles rise to the surface, carrying the surfactant compounds along. At the water's surface, the bubbles gather into a foam which can be collected, removing the surfactant compounds from the water.

Protein skimmers are particularly widely used in saltwater aquaria. Numerous different kinds and configurations of protein skimmers are in existence. Most protein skimmers, however, feature a few basic components. Protein skimmers typically employ a reservoir, or "reaction chamber". Aquarium water is circulated from the aquarium, through the reaction chamber, and back to the aquarium. Typically, the volume of the reaction chamber is relatively small in relation to the aquarium. A means for circulating aquarium water into the reaction chamber and back to the aquarium, such as one or more water pumps, perhaps in conjunction with one or more siphon tubes, is provided. Another basic component of a protein skimmer is a source of air bubbles that are injected into the aquarium water within the reaction chamber. A typical source of the air bubbles is an air stone placed in the reaction chamber. Another common source for the air bubbles is an air venturi in a water supply line that delivers water into the reaction chamber. The venturi draws air into the water stream passing through the water supply line, delivering air bubbles along with the water into the reaction chamber.

The air bubbles, suspended in the aquarium water within the reaction chamber, accumulate waste products. As the waste-laden air bubbles build a head of foam at the water's surface, a foam channel at the top of the reaction chamber channels the accumulating foam upward, and the foam overflows the foam channel into a collection cup from which the foam can be periodically removed.

U.S. Pat. No. 6,156,209, issued on Dec. 5, 2000 to J. Kim, discloses a protein skimmer that employs an injector for spraying water into a reaction chamber. The spraying action causes generation of air bubbles in the reaction chamber.

U.S. Pat. No. 5,282,962, issued on Feb. 1, 1994 to C. Chen, illustrates a protein skimmer that uses an air inlet tube to draw air into a water pump's impeller housing. Thus, air bubbles are injected into the stream of water pumped into the protein skimmer's reaction chamber.

U.S. Pat. No. 5,006,230, issued on Apr. 9, 1991 to P. Votava III et al., discloses a dual action aquarium filter that incorporates a protein skimmer, utilizing an air stone to generate air bubbles.

The effectiveness of a protein skimmer in removing waste materials from aquarium water is determined in large part by the quantity and size of the air bubbles, by the "contact time" that the bubbles are held in suspension in the water, and by the rate of flow of the aquarium water through the protein skimmer. The arrangement of components of a protein skimmer, and in fact the arrangement of a protein skimmer in an aquarium system, may be highly varied to alter the variables of air bubble volume and size, contact time, and water flow rate.

U.S. Pat. No. 6,303,028, issued on Oct. 16, 2001 to N. Marks et al., discloses a protein skimmer including a self-contained centrifugal pump for circulating water through the protein skimmer. Air is drawn into water on the supply side of the water pump, the pump thus injecting an air bubble laden stream of water into the protein skimmer's reaction chamber. The protein skimmer, in part due to its self-contained design, can be mounted on an aquarium sidewall, drawing water directly from, and returning water directly to, the aquarium.

U.S. Pat. No. 6,436,295, issued on Aug. 20, 2002 to J. Kim, illustrates a protein skimmer operating within a sump. Aquarium water siphons from the aquarium to a sump. The protein skimmer is disposed within the sump, and aquarium water from the sump is pumped through the skimmer and discharged back into the sump. The treated water from the sump is then pumped back into the aquarium.

The installation and maintenance instructions for the D-Deltec AP series protein skimmers, known to be published on the Internet at least as of October 2003, for a commercially available product, illustrates a protein skimmer that uses a needle wheel pump to inject air bubbles into a stream of water drawn from the reaction chamber of a protein skimmer, the water and air bubble mixture being returned to the reaction chamber. This arrangement, however, does not continuously recycle the air-bubble laden water within the reaction chamber. The needle wheel pump draws water from below the level of air bubbles within the reaction chamber. It is believed that the needle wheel pump, while effective in generating air bubbles, lacks the suction to draw the air-bubble laden water downward for re-circulation. Additionally, with the needle wheel pump drawing water from below the water return pipe, it would be undesirable for the level of air-bubble laden water to extend downward beyond the water return pipe since it is undesirable for the air-bubble laden water to be returned into the aquarium.

None of the above inventions and patents, taken either singly or in combination, is seen to describe the instant invention as claimed. Thus an aquarium protein skimmer solving the aforementioned problems is desired.

SUMMARY OF THE INVENTION

The aquarium protein skimmer of the present invention achieves enhanced performance by providing a re-circulating pump to re-circulate air-bubble laden water within the reaction chamber of the protein skimmer.

The re-circulating pump may be mounted either externally or internally to the protein skimmer's reaction chamber. Air-bubble laden water is drawn from the reaction chamber into the re-circulating pump and re-introduced into the reaction chamber. The result is a re-circulating flow of the air-bubble laden water, causing the air bubbles to remain held in suspension in the reaction chamber for a longer period of time. Additionally, the turbulent re-circulation of the air bubbles through the re-circulating pump tends to cause the air bubbles to break down to a greater density of smaller air bubbles. Thus, an increased quantity of air bubbles, a smaller size of the air bubbles, and an increased contact time of the air bubbles within the reaction chamber enhance the protein skimmer's performance.

Preferably, the aquarium protein skimmer utilizes a single water pump both to create a re-circulating flow of air-bubble laden water within the reaction chamber and to circulate aquarium water through the protein skimmer. The protein skimmer thus achieves the benefits of an increased quantity of air bubbles, a smaller size of the air bubbles, and an increased contact time of the air bubbles within the reaction chamber without the need for an additional water pump.

Accordingly, it is a principal object of the invention to provide an aquarium protein skimmer with a re-circulating pump to re-circulate air-bubble laden water within the skimmer's reaction chamber.

It is another object of the invention to provide an aquarium protein skimmer with a re-circulating pump to increase the quantity of air bubbles within the skimmer's reaction chamber.

It is a further object of the invention to provide an aquarium protein skimmer with a re-circulating pump to decrease the size of air bubbles within the skimmer's reaction chamber.

Still another object of the invention is to provide an aquarium protein skimmer with a re-circulating pump to increase the contact time of air bubbles within the skimmer's reaction chamber.

Yet another object of the invention is to provide an aquarium protein skimmer with a re-circulating pump to increase the capacity of the aquarium protein skimmer to remove waste from aquarium water.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
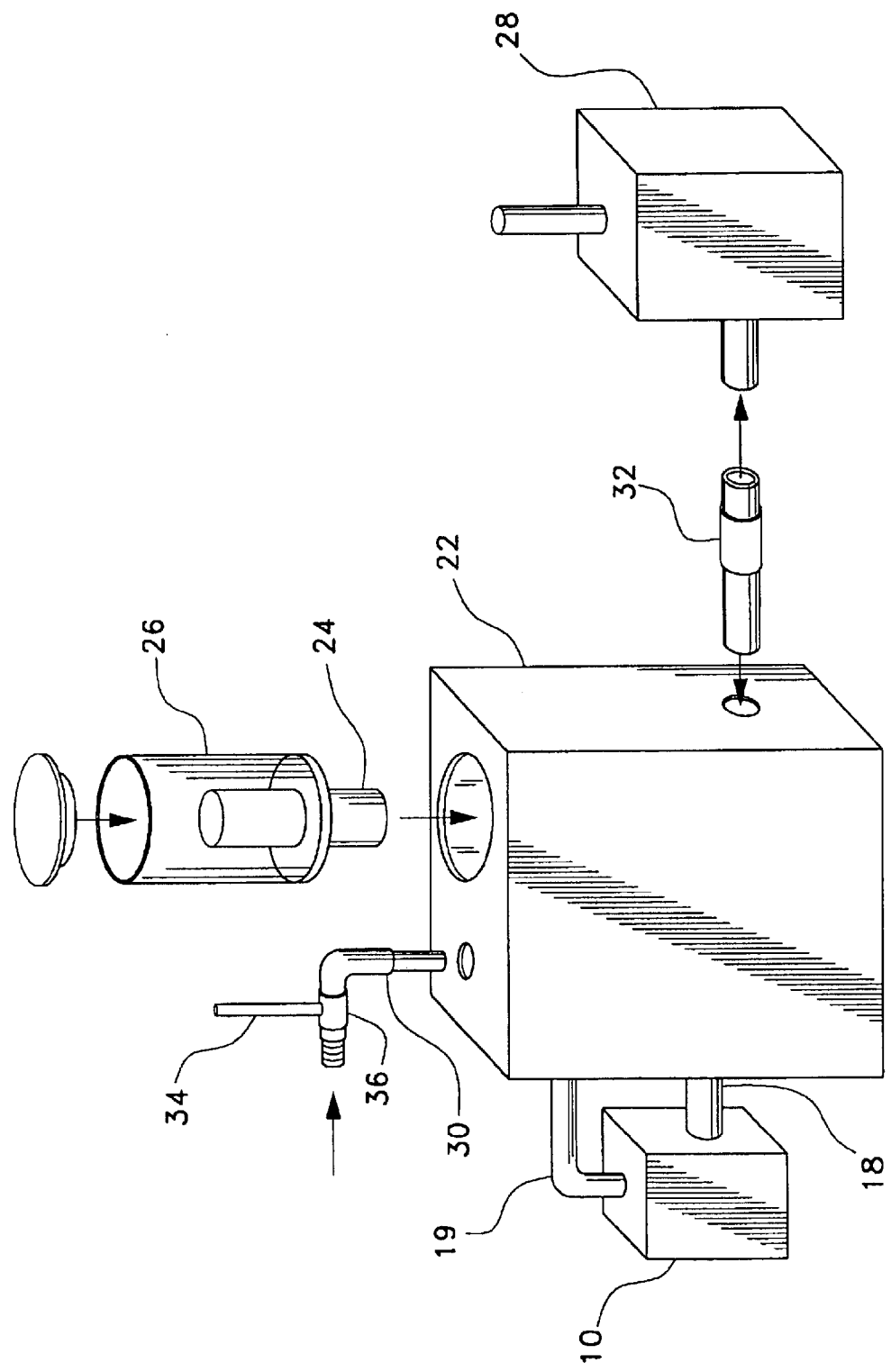
FIG. 1 is an environmental, perspective view of an aquarium protein skimmer according to the present invention.

The present invention is an aquarium protein skimmer. Referring to FIG. 1, according to the present invention, a conventional protein skimmer is enhanced by the addition of a re-circulating pump 10 connected to the protein skimmer by a water supply line 18 and a water return line 19.

A conventional protein skimmer typically comprises a reaction chamber 22, the reaction chamber 22 being a reservoir having an interior space for retaining a quantity of aquarium water. A foam column 24 and a foam collection cup 26 are fitted to the top of the reaction chamber 22. A water supply line 30 delivers aquarium water to the interior of the reaction chamber 22, and water pump 28 pumps water through a water return line 32 back into an aquarium. It can be appreciated that such a system can be configured in a variety of ways, such as with the water pump 28 on either the supply side of the protein skimmer or on the return side as illustrated. Additional pumps, or gravity feed siphons or the like, might be employed to complete the plumbing of the system as would be understood by one of skill in the art. In the example illustrated, air is introduced into the reaction chamber 22 by an air inlet 34 and an air venturi 36.

The re-circulating pump 10 draws water from the reaction chamber 22 through the water supply line 19, and returns the water into the reaction chamber 22 through water return line 18. Air bubbles, introduced into the reaction chamber by the air inlet 34 and the venturi 36, are drawn with the water into the re-circulating pump 10 and returned to the reaction chamber 22. Thus, a continuous re-circulating flow of air-bubble laden water is generated within the reaction chamber 22 by the re-circulating pump 10, thereby increasing the contact time of the air bubbles within the reaction chamber 22. Additionally, as air bubbles repeatedly pass through the re-circulating pump 10, they tend to be broken up into smaller sized bubbles. An additional effect of the re-circulating pump 10, therefore, is an increased number of smaller air bubbles within the reaction chamber 22.

It can be recognized that the level within the reaction chamber 22 where water is drawn by the re-circulating pump 10 is important. The air bubbles, of course, tend to float upward from the point where they enter into the reaction chamber 22. While water flow and turbulence within the reaction chamber 22 may displace some of the air bubbles to a slightly lower level, it can be understood that near the bottom of the reaction chamber 22 the density of air bubbles drops off to essentially no bubbles. The water supply line 19 to the re-circulating pump 10 must, therefore, be located at a level in the reaction chamber 22 where the water contains a good density of air bubbles. This may be accomplished by locating the water supply line 19 at or above the level in the reaction chamber 22 where air bubbles are introduced. Also, the water supply line 18 may be located slightly below this level if the re-circulating pump 10 has sufficient suction to draw the air-bubble laden water from above.

Figure 2:
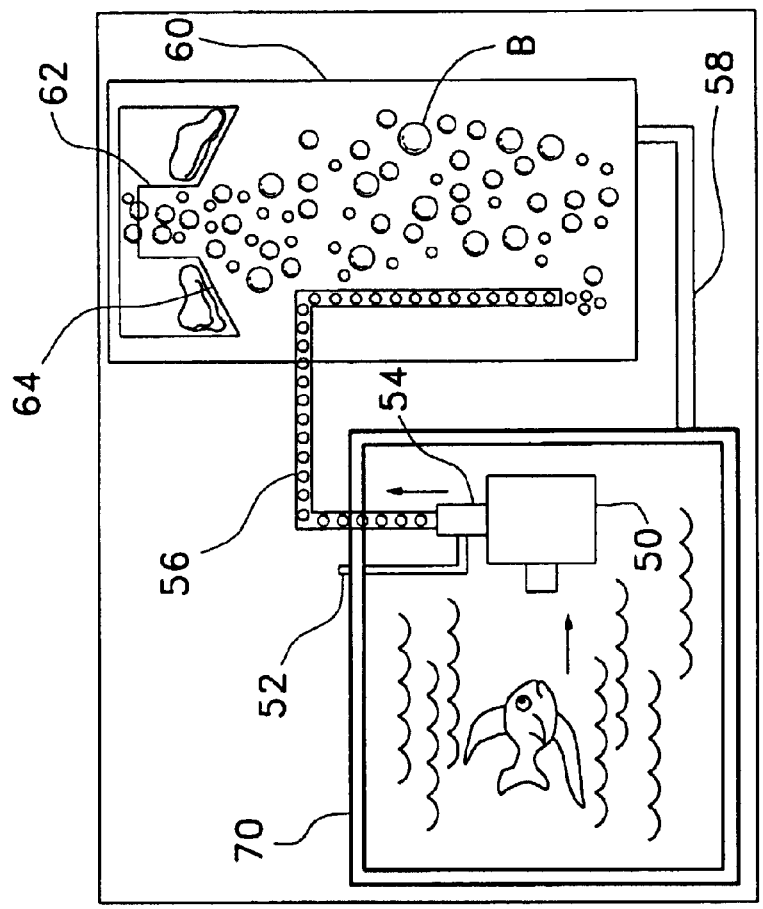
FIG. 2 is a diagrammatic view of a conventional protein skimmer generally known in the art.

FIG. 2 shows a diagrammatic view of a conventional protein skimmer of the prior art in connection with an aquarium 70. Water pump 50 draws water from the aquarium 70, and supplies the water to the reaction chamber 60 through water supply line 56 (supplying water to the reaction chamber 60). Air is introduced by air inlet 52 and venturi 54. Water is returned to the aquarium 70 by water return line 58. Air bubbles B collect waste material, foaming upward through foam column 62 and into foam collection cup 64.

Figure 3:
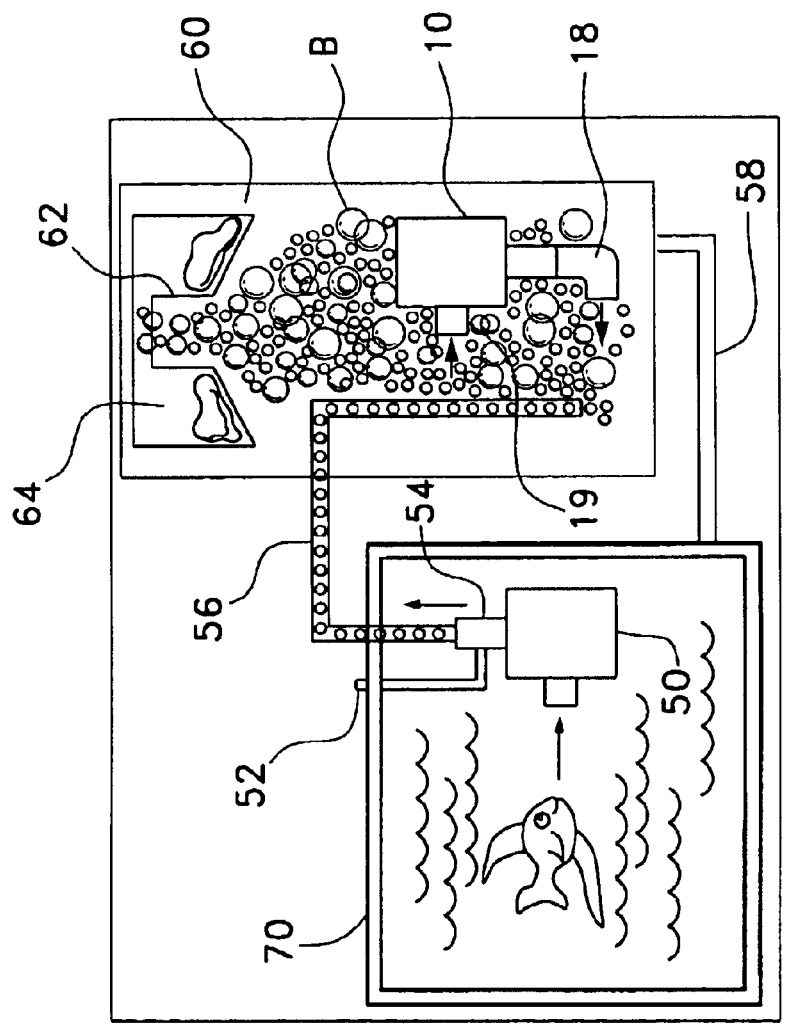
FIG. 3 is a diagrammatic view of a first embodiment of an aquarium protein skimmer according to the present invention.
Figure 4:
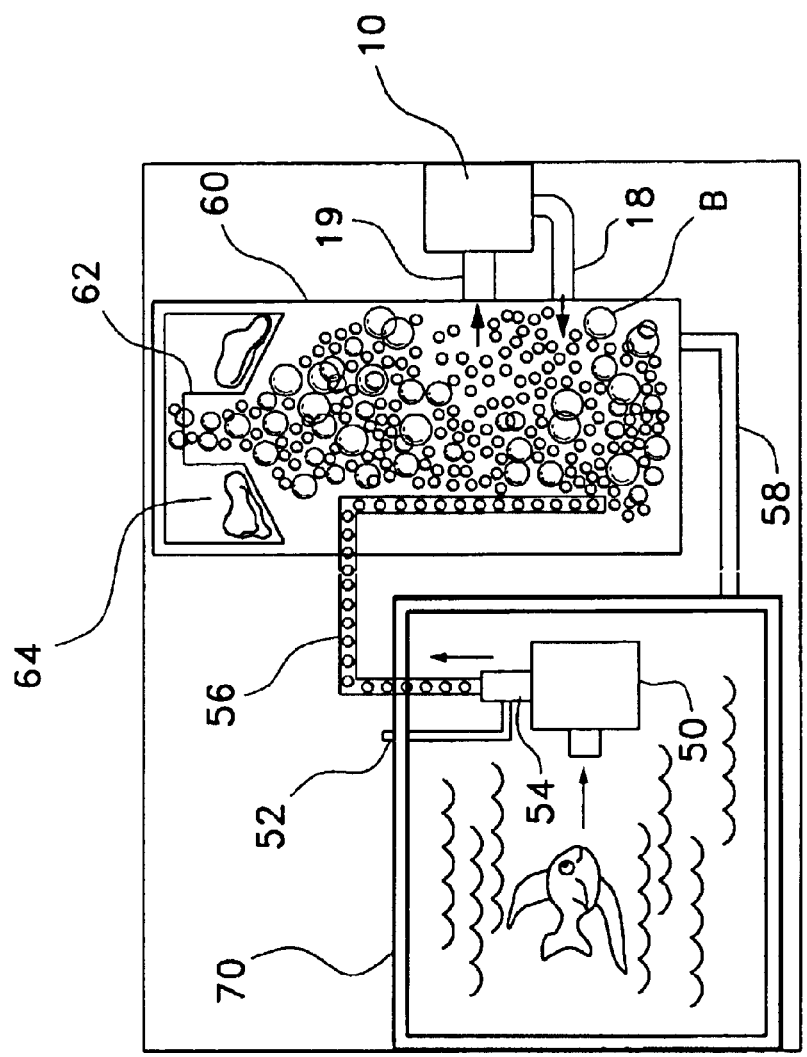
FIG. 4 is a diagrammatic view of a second embodiment of an aquarium protein skimmer according to the present invention.

Turning now to FIGS. 3 and 4, the re-circulating pump 10 is shown configured to re-circulate the air-bubble laden water within the reaction chamber 60. In FIG. 3, re-circulating pump 10 is contained within the reaction chamber 60. FIG. 4 shows an alternate arrangement wherein the re-circulating pump 10 is disposed on the outside of the reaction chamber 60, connected to the reaction chamber 60 by a water supply line 19 and a water return line 18.

Figure 5A:
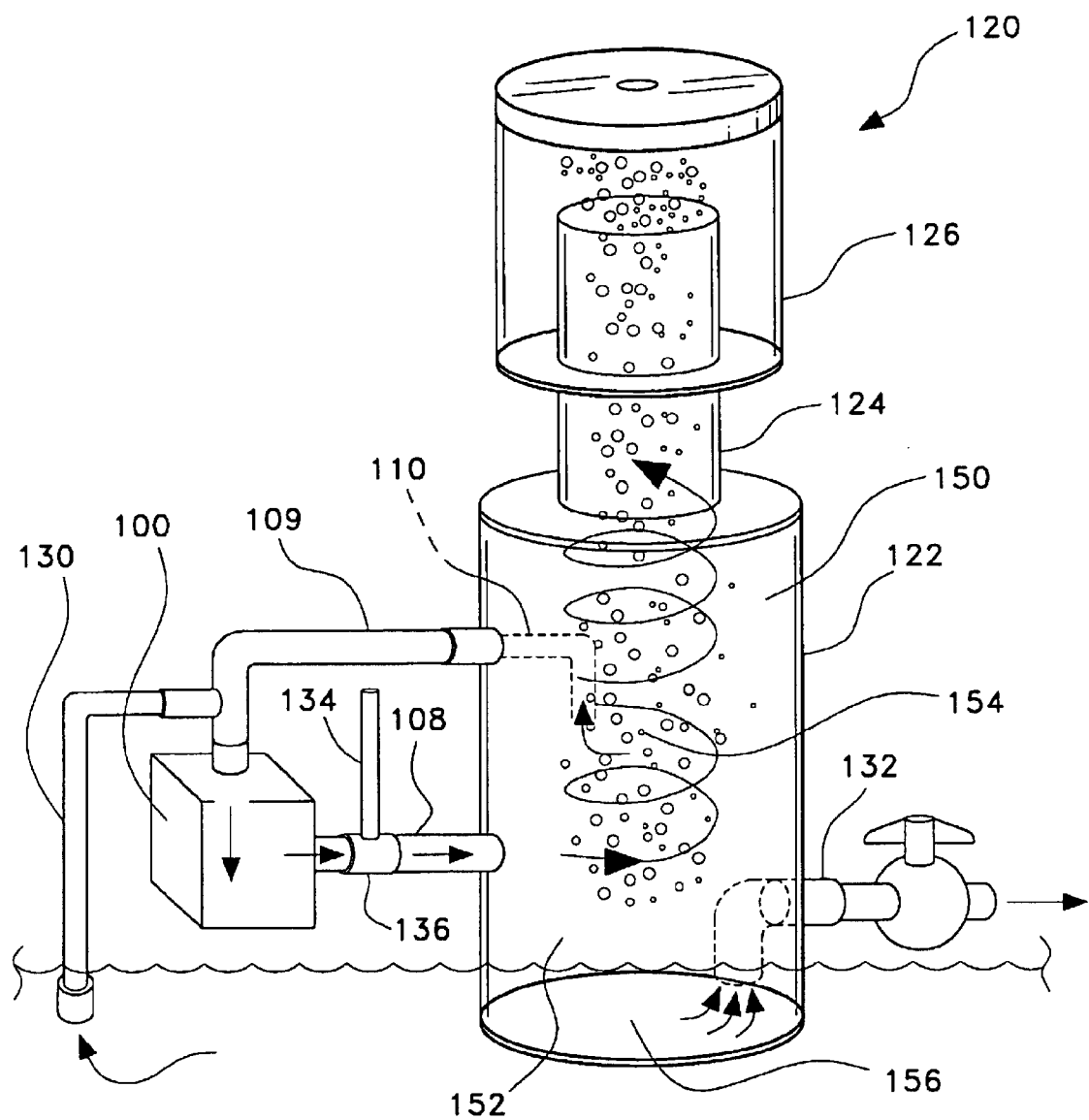
FIG. 5A is a perspective view of an aquarium protein skimmer according to the present invention showing a first water flow circulation through the skimmer.
Figure 5B:
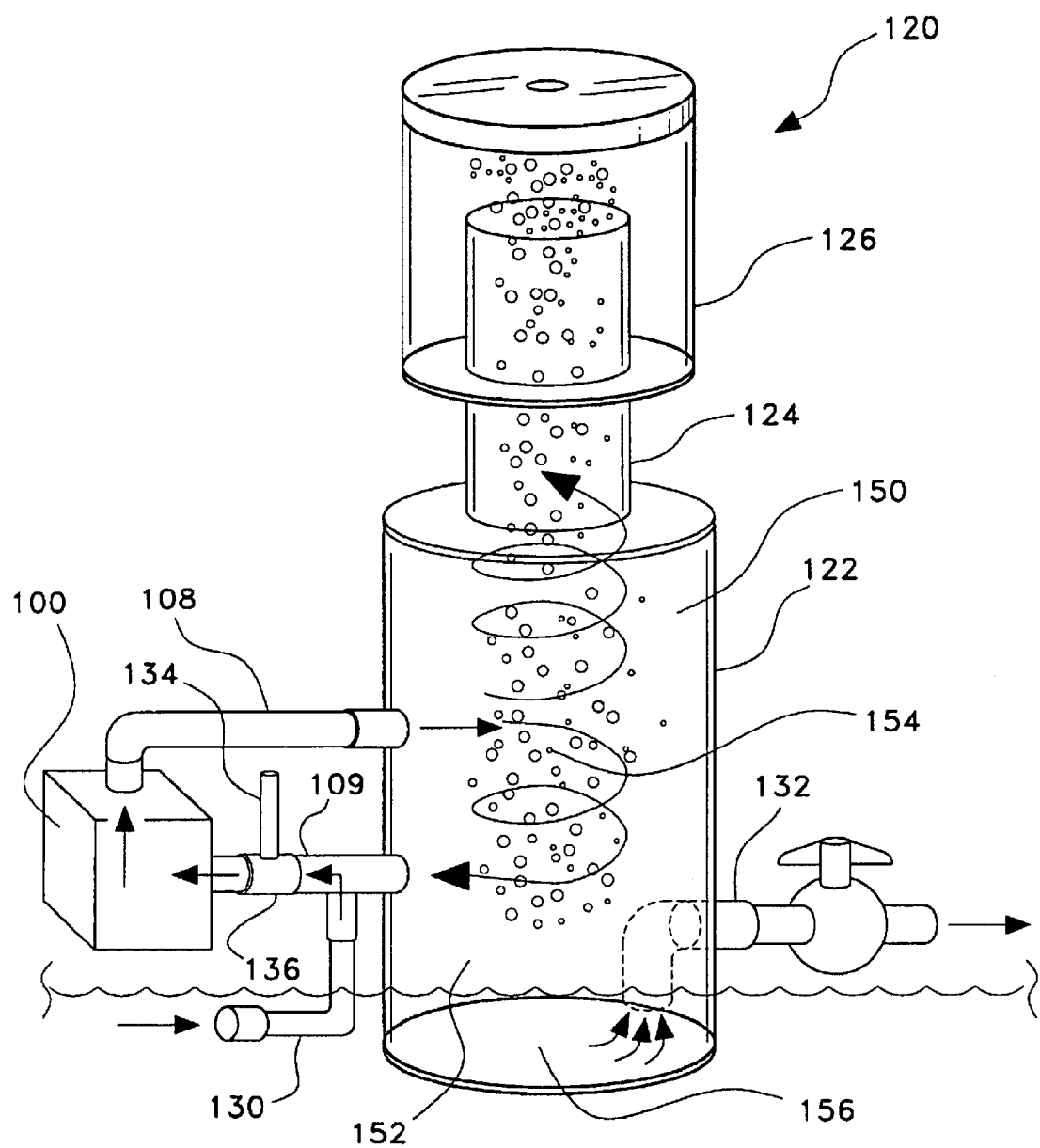
FIG. 5B is a perspective view of an aquarium protein skimmer according to the present invention showing an alternative water flow circulation through the skimmer.
Figure 6:
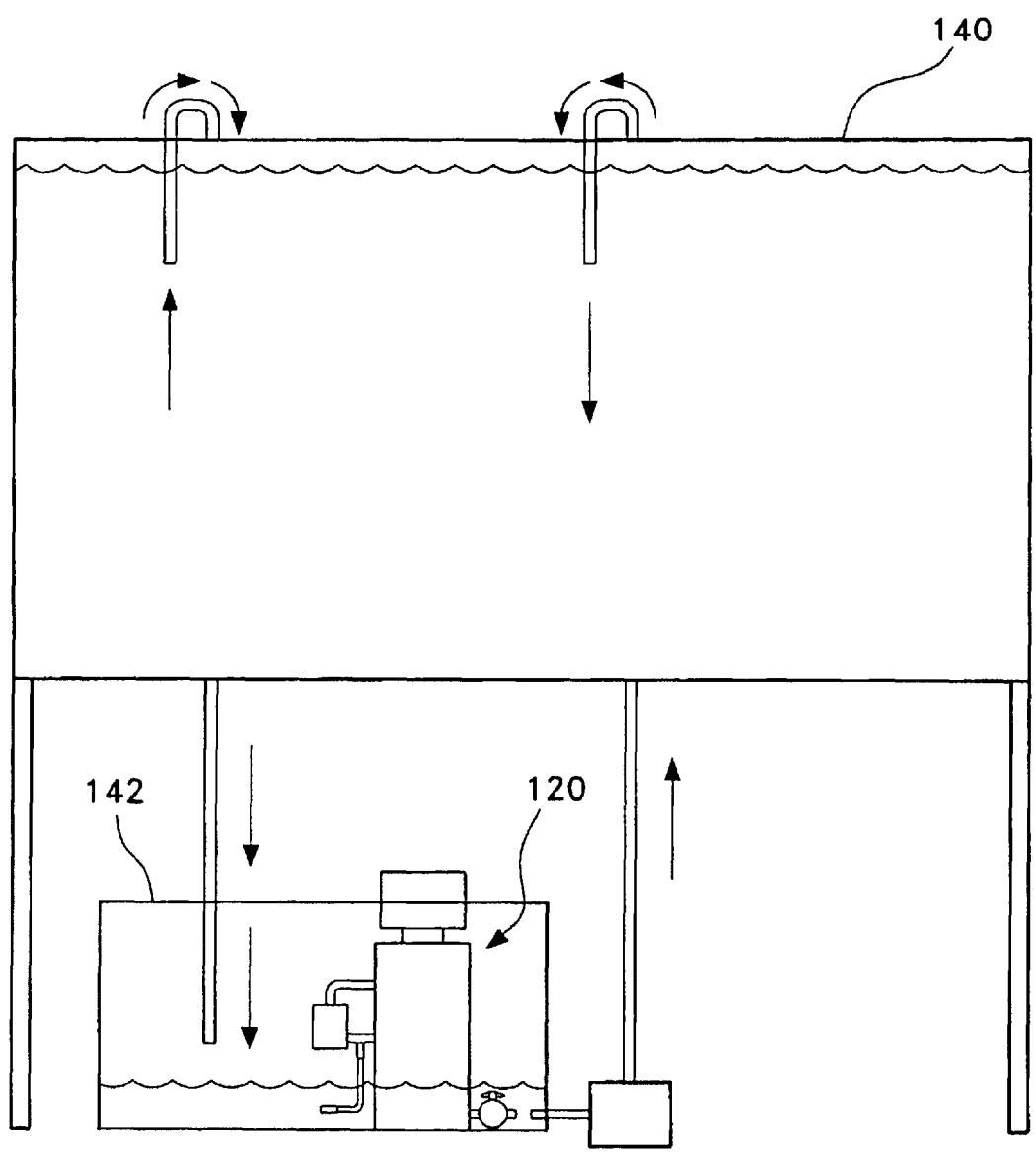
FIG. 6 is a diagrammatic view of an aquarium cleaning system including the aquarium protein skimmer illustrated in FIG. 5.

Turning now to FIGS. 5A, 5B, and 6, another embodiment of an aquarium protein skimmer 120 is shown. The aquarium protein skimmer 120 is shown in FIG. 6 in a sump configuration, wherein aquarium water is siphoned from an aquarium 140 into a sump 142 and pumped from the-sump 142 back to the aquarium 140. The aquarium protein skimmer 120 is disposed in the sump 142, drawing the siphoned aquarium water from the sump 142 and returning cleaned water to the sump 142. It will be recognized by those skilled in the art that in another configuration, aquarium water may be supplied directly from the aquarium to the protein skimmer and returned directly to the aquarium.

Referring to FIGS. 5A and 5B, a water re-circulating pump 100 is connected to a reaction chamber 122 by a water supply line 109 (supplying water from the reaction chamber 122 to the pump 100), and by a water return line 108 (returning water from the re-circulating pump 100 to the reaction chamber 122). The water re-circulating pump 100 preferably comprises a conventional impellor-type centrifugal pump, or the like, driven by an electric motor. The re-circulating pump 100 causes a re-circulating flow of water in the protein skimmer 120. An air source consisting of an air inlet 134 and venturi 136 are located in either the water supply line 109 (as shown in FIG. 5B) or the water return line 108 (as shown in FIG. 5A). An advantage of placing the air source in the water supply line 109 is that the action of the pump 100 will cause air bubbles drawn from the air supply to be broken into a smaller size.

In addition to the re-circulating water flow, aquarium water is drawn into the re-circulating pump 100 through aquarium water supply line 130, which connects to the water supply line 109, and is aerated by the air bubbles supplied by the air source. A water outlet 132, connected to the reaction chamber 122, allows water to flow from the reaction chamber 122, returning cleaned water to the aquarium 140. Thus, the single re-circulating pump 100 functions both to create a re-circulating flow of air-bubble laden water within the protein skimmer 120 and to circulate aquarium water to and from the aquarium 140 or sump 142.

The reaction chamber 122 itself is preferably a cylindrical container, having top and bottom ends and a hollow interior. The reaction chamber 122 stands upright on its bottom end. Functionally, the reaction chamber can be considered to have a top half 150 and a bottom half 152. A foam column 124 is disposed at the top end of the reaction chamber 122, and a foam collection cup 126 is disposed at the top end of the reaction chamber and surrounding the foam column 124. The foam column 124 is a cylindrical tube that is open at both ends. A first end of the foam column is in communication with the hollow interior of the reaction chamber 122. A second end of the foam column 124 extends above the reaction chamber 122. Foam accumulating in the reaction chamber 122 rises through the foam column 124 and spills into the collection cup 126 for removal.

The water outlet 132 is located near the bottom of the reaction chamber 122. The re-circulating pump 100 can be arrange to re-circulate water either from an upper part of the reaction chamber 122 to a lower part of the reaction chamber 122, or in the opposite direction, from a lower part of the reaction chamber 122 to an upper part of the reaction chamber 122. Illustrated in FIG. 5A, the water supply line 109 is located above the level of the water outlet 132 and preferably in the top half 150 of the reaction chamber 122, at least a distance of one-half the height of the reaction chamber 122 above the bottom of the reaction chamber 122. The water return line 108 is located below the water supply line 108 in order to maximize the rise time of the air bubbles in the reaction chamber 122, and so that the air bubbles can be re-circulated by being drawn through the supply line 109 into the pump to be broken down to a smaller size. In this arrangement, the circulation is from an upper part of the reaction chamber 122 to a lower part of the reaction chamber 122.

Illustrated in FIG. 5B, the direction of re-circulation is reversed, with water supply line 109 located above the level of the water outlet 132 but in the bottom half 152 of the reaction chamber 122. The water return line 108 is located above the water supply line 109. The vertical spacing between the water supply line 108 and the water return line 109 is such that the suction of the re-circulating pump 100 is able to draw air-bubble laden water into the pump 100 despite the tendency of the air bubbles to float upward, thus ensuring that air bubbles are re-circulated by the re-circulating flow of water within the aquarium protein skimmer 120. The re-circulating flow of air bubble laden water defines a region of air-bubble laden water 154 within the reaction chamber 122, and a region of air bubble-free water 156 near the bottom of the reaction chamber 122.

It is to be understood that the present invention is not limited to the embodiments described above, but encompasses any and all embodiments within the scope of the following claims.

I claim:

1. An aquarium protein skimmer, comprising:

a reaction chamber, the reaction chamber being a container having top and bottom ends and a hollow interior;

a foam column extending from the top end of said reaction chamber;

a foam collection cup disposed on the top end of said reaction chamber and surrounding said foam column;

means for circulating aquarium water through said reaction chamber;

means for introducing air bubbles into said aquarium water in said reaction chamber; and a water re-circulating pump disposed within said reaction chamber, the water pump having an input and an output, the input being located above a point where the air bubbles are introduced into said reaction chamber.

2. An aquarium protein skimmer, comprising:

a reaction chamber, the reaction chamber being a container having top and bottom ends, top and bottom halves, and a hollow interior;

a foam column extending from the top end of said reaction chamber;

a foam collection cup disposed on the top end of said reaction chamber and surrounding said foam column;

a water outlet disposed near the bottom of said reaction chamber;

a water re-circulating pump having an input and an output, the input and output of the pump being in communication with said reaction chamber;

a pump water supply line disposed between the input of said water re-circulating pump and said reaction chamber, said pump water supply line being connected to the bottom half of said reaction chamber above the level of said water outlet;

a water return line disposed between the output of said water re-circulating pump and said reaction chamber;

an aquarium water supply line in communication with the said pump; and an air source disposed inline between said water re-circulating pump and said reaction chamber.

3. The aquarium protein skimmer according to claim 2, wherein said air source comprises an air venturi disposed within said water return line.

4. The aquarium protein skimmer according to claim 2, wherein said air source comprises an air venturi disposed within said pump water supply line.

5. The aquarium protein skimmer according to claim 2, wherein said water return line is connected to said reaction chamber above the level of said pump water supply line.

6. The aquarium protein skimmer according to 2, wherein said water re-circulating pump is an impeller water pump.

* * * * *